US011024897B2

(12) United States Patent
Son et al.

(10) Patent No.: US 11,024,897 B2
(45) Date of Patent: Jun. 1, 2021

(54) BATTERY-COOLING HEAT SINK PROVIDED WITH PCM CAPSULE

(71) Applicant: LG CHEM, LTD., Seoul (KR)

(72) Inventors: Sang-Il Son, Daejeon (KR); Yong-Seok Choi, Daejeon (KR); Hun Cha, Daejeon (KR)

(73) Assignee: LG CHEM, LTD., Seoul (KR)

( * ) Notice: Subject to any disclaimer, the term of this patent is extended or adjusted under 35 U.S.C. 154(b) by 267 days.

(21) Appl. No.: 16/318,276

(22) PCT Filed: Dec. 21, 2017

(86) PCT No.: PCT/KR2017/015165
§ 371 (c)(1),
(2) Date: Jan. 16, 2019

(87) PCT Pub. No.: WO2018/128306
PCT Pub. Date: Jul. 12, 2018

(65) Prior Publication Data
US 2019/0288351 A1    Sep. 19, 2019

(30) Foreign Application Priority Data

Jan. 5, 2017  (KR) .................. 10-2017-0002017

(51) Int. Cl.
*H01M 10/613*    (2014.01)
*H01M 10/653*    (2014.01)
(Continued)

(52) U.S. Cl.
CPC ........ *H01M 10/613* (2015.04); *F28D 1/0341* (2013.01); *F28D 20/02* (2013.01);
(Continued)

(58) Field of Classification Search
CPC .. H01M 10/42; H01M 10/613; H01M 10/625; H01M 10/653; H01M 10/6556;
(Continued)

(56) References Cited

U.S. PATENT DOCUMENTS

| 5,731,568 A | 3/1998 | Malecek |
| 8,109,324 B2 | 2/2012 | Farid et al. |

(Continued)

FOREIGN PATENT DOCUMENTS

| EP | 2993435 A1 | 3/2016 |
| JP | 2005-26219 A | 1/2005 |

(Continued)

OTHER PUBLICATIONS

Azzouz et al., Heat Exchange Plate for Thermal Management of a Battery Pack, Mar. 9, 2016, EPO machine translation (Year: 2016).*

(Continued)

*Primary Examiner* — Adam A Arciero
(74) *Attorney, Agent, or Firm* — Birch, Stewart, Kolasch & Birch, LLP.

(57) ABSTRACT

A battery module including a battery-cooling heat sink having a PCM capsule. The battery-cooling heat sink provides a uniform temperature of a cooling fluid flowing through the battery module using a PCM capsule, minimizes a temperature variation of the cooling fluid over the entire area of the heat sink formed in the battery module, and prevents the temperature at a cooling fluid outlet of the heat sink from being higher than that of a cooling fluid inlet.

12 Claims, 4 Drawing Sheets

(51) Int. Cl.
*F28D 20/02* (2006.01)
*H01M 10/658* (2014.01)
*H01M 10/6556* (2014.01)
*H01M 10/6571* (2014.01)
*H01M 10/659* (2014.01)
*H01M 10/42* (2006.01)
*H01M 10/625* (2014.01)
*F28D 1/03* (2006.01)
*H01M 10/6567* (2014.01)
*H01M 50/20* (2021.01)
*H01M 50/572* (2021.01)
*F28D 20/00* (2006.01)

(52) U.S. Cl.
CPC ......... *H01M 10/42* (2013.01); *H01M 10/625* (2015.04); *H01M 10/653* (2015.04); *H01M 10/658* (2015.04); *H01M 10/659* (2015.04); *H01M 10/6556* (2015.04); *H01M 10/6567* (2015.04); *H01M 10/6571* (2015.04); *H01M 50/20* (2021.01); *H01M 50/572* (2021.01); *F28D 2020/0013* (2013.01); *H01M 2220/20* (2013.01)

(58) Field of Classification Search
CPC ..... H01M 10/6567; H01M 10/106571; H01M 10/658; H01M 10/659; H01M 2220/20; H01M 2/10; H01M 2/34; F28D 1/0341; F28D 2020/0013; F28D 20/02; Y02E 60/10; Y02E 60/14
See application file for complete search history.

(56) References Cited

U.S. PATENT DOCUMENTS

| | | | |
|---|---|---|---|
| 8,835,035 | B2 | 9/2014 | Kim |
| 9,312,580 | B2 | 4/2016 | Nguyen et al. |
| 9,401,500 | B2 | 7/2016 | Kwak et al. |
| 9,774,063 | B2 | 9/2017 | Wayne et al. |
| 2009/0211726 | A1 | 8/2009 | Bank et al. |
| 2011/0151301 | A1 | 6/2011 | Kim |
| 2011/0189522 | A1 | 8/2011 | Kim |
| 2013/0084487 | A1 | 4/2013 | Kwak et al. |
| 2014/0248515 | A1 | 9/2014 | Wayne et al. |
| 2016/0006088 | A1 | 1/2016 | Boetcher et al. |
| 2016/0049705 | A1 | 2/2016 | Mahe et al. |
| 2016/0204488 | A1 | 7/2016 | Arai et al. |

FOREIGN PATENT DOCUMENTS

| | | | |
|---|---|---|---|
| JP | 2010-192333 A | | 9/2010 |
| JP | 2011-527740 A | | 11/2011 |
| JP | 2015-41418 A | | 3/2015 |
| JP | 2016-40770 A | | 3/2016 |
| JP | 2016-524114 A | | 8/2016 |
| KR | 10-2011-0070199 A | | 6/2011 |
| KR | 10-2011-0089661 A | | 8/2011 |
| KR | 10-2013-0035129 A | | 4/2013 |
| KR | 10-2014-0034413 A | | 3/2014 |
| KR | 20-2014-0002779 U | | 5/2014 |
| KR | 10-2016-0112435 A | | 9/2016 |
| KR | 10-1658517 B1 | | 9/2016 |
| KR | 10-2016-0118061 A | | 10/2016 |

OTHER PUBLICATIONS

International Search Report (PCT/ISA/210) issued in PCT/KR2017/015165, dated Apr. 19, 2018.
Knowles, "PCM Thermal Control of Nickel-Hydrogen Batteries", Phillips Laboratory, Jun. 1993, Total 61 pages.
Extended European Search Report dated May 16, 2019, for corresponding European Application No. 17889828.4.

* cited by examiner

【FIG. 1】
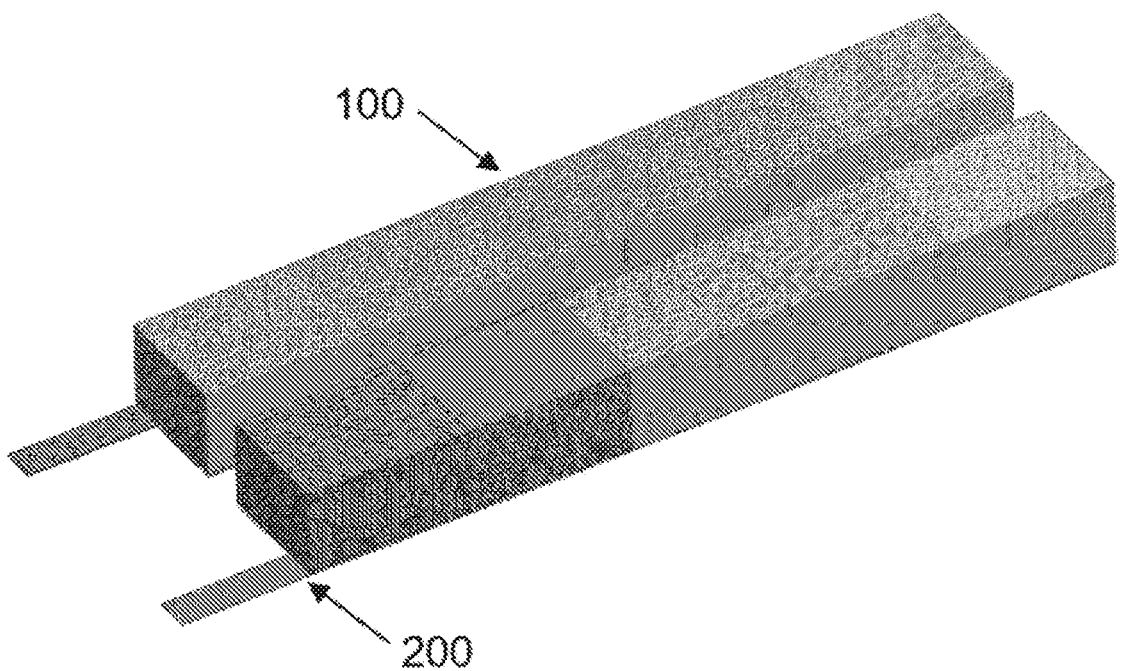
Related Art

【FIG. 2】
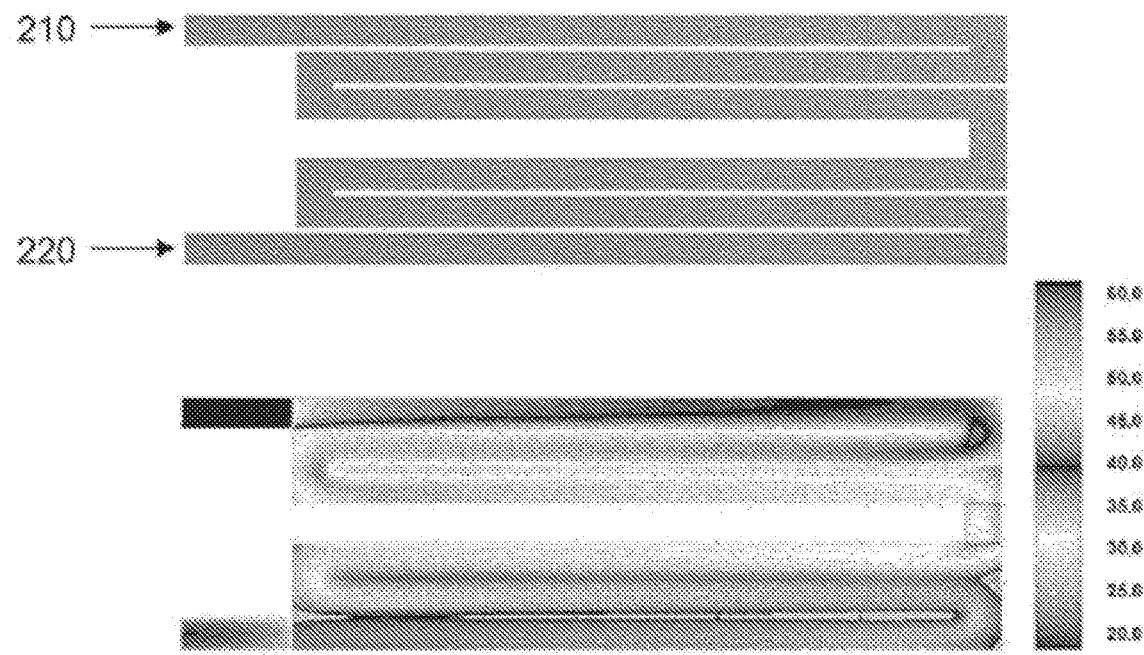
Related Art
【FIG. 3】
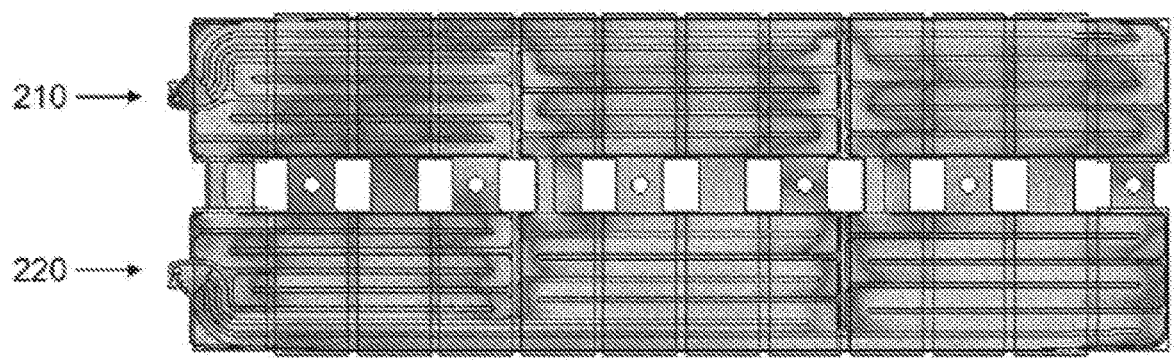
Related Art

[FIG. 4]
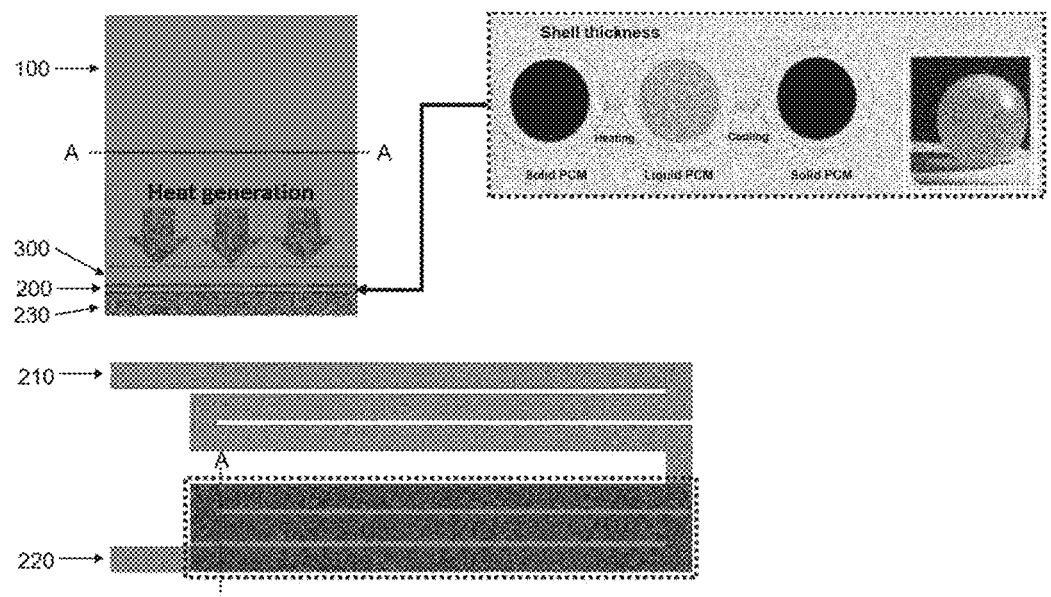
[FIG. 5]
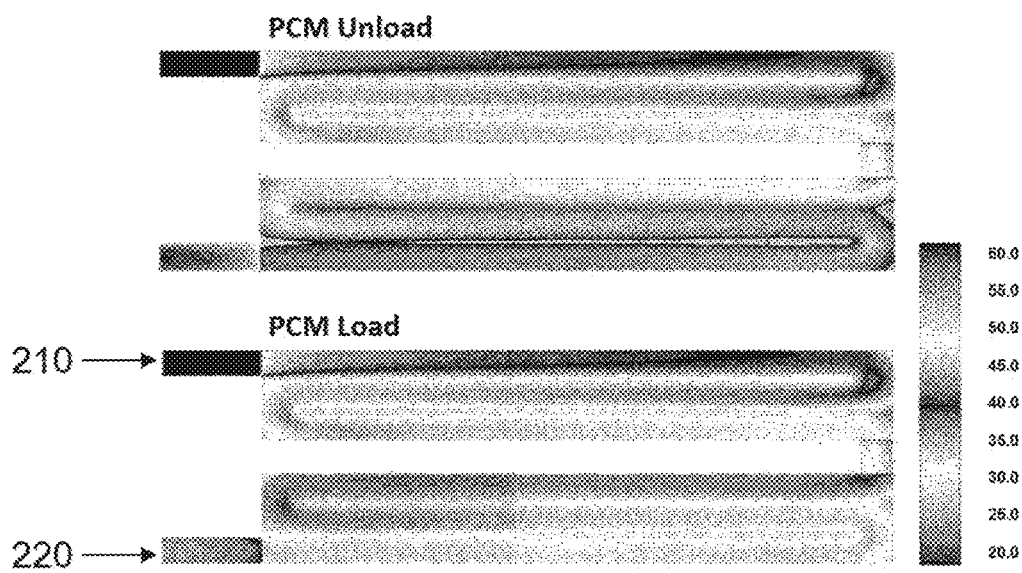

[FIG. 6]
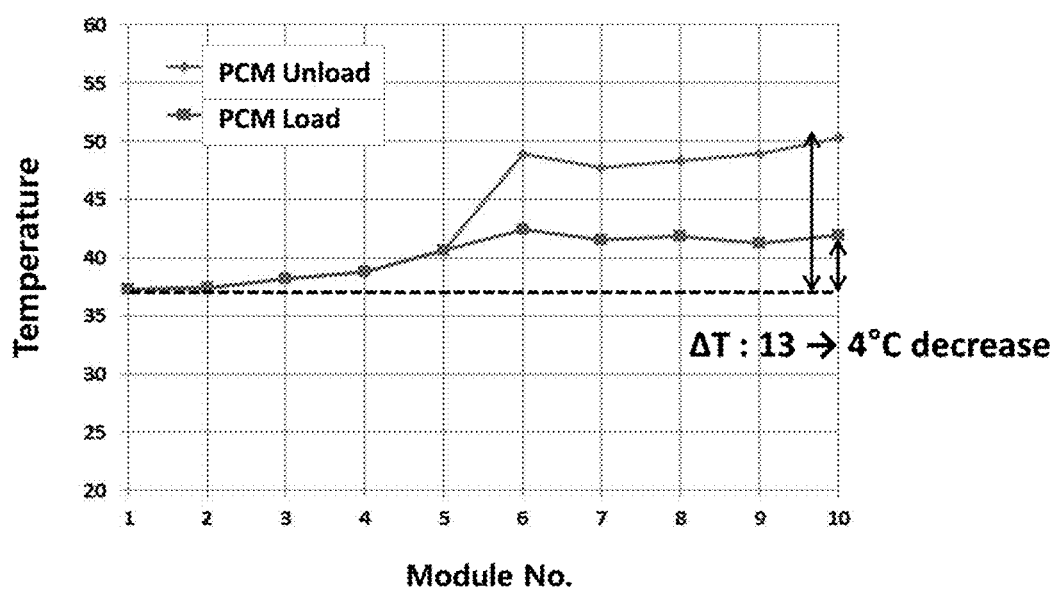

BATTERY-COOLING HEAT SINK PROVIDED WITH PCM CAPSULE

The present application claims priority under 35 U.S.C. § 119(a) to Korean Patent Application No. 10-2017-0002017 filed on Jan. 5, 2017 in the Republic of Korea, the disclosure of which is hereby incorporated by reference in its entirety.

TECHNICAL FIELD

The present invention relates to a battery-cooling heat sink provided with a phase change material (PCM) capsule. More particularly, the present invention relates to a battery-cooling heat sink provided with a PCM capsule, the heat sink having an advantage of uniformizing the temperature of a cooling fluid flowing through a battery module by using a PCM, thereby solving a problem with a conventional heat sink in that the temperature of a cooling liquid is not uniform through a battery module, and also relates to a battery module including the heat sink.

BACKGROUND ART

Secondary batteries (also called rechargeable batteries) having electrical characteristics such as high energy density and easy adaptability to various products are widely used not only for portable devices but also for energy storage systems, and electric vehicles (EVs) and hybrid electric vehicles (HEVs), which drive on electric energy. Such a secondary battery has attracted attention as a new energy source in terms of high energy efficiency and eco-friendliness because of producing no harmful byproducts during use thereof as well as its primary advantage of dramatically reducing usage of fossil fuel.

A battery pack mounted in an electric vehicle (EV) is configured using a plurality of cell assemblies (each cell assembly including a plurality of battery cells) connected in series to obtain high output power. Each cell includes an anode current collector, a cathode current collector, an anode active material, a cathode active material, a separator, an electrolyte, etc., and can repeatedly perform charging and discharging through electrochemical reactions among the components. Recently, the demand for a high capacity battery pack for an energy storage system has increased. Accordingly, the demand for a multi-module battery pack in which a plurality of battery modules, each including a plurality of secondary cells connected in series or in parallel, is integrated has been growing.

Secondary cells included in each battery module are provided in various forms. For example, examples of the forms of the secondary cells include a pouch type, a cylinder type, and a rectangular prism type. The pouch type secondary cells are actively used in thin and lightweight applications because the pouch type secondary cells are light and are freely deformable. A casing of a pouch type secondary cell is formed of a thin metal film and insulation films laminated on both primary surfaces of the metal film, unlike a circular secondary cell and a rectangular prism cell that are enclosed in a thick metal casing. Therefore, a pouch type secondary cell has a flexible structure and is provided with an internal space in which an electrode group may be received.

A high capacity and high output power secondary battery pack configured using pouch secondary cells is formed such that a plurality of thin plate-shaped cells is integrated as one module, and a plurality of modules is connected in series according to the required specifications and is packed into one package. In the package in which a plurality of battery modules is connected in series, heat is generated by each secondary cell during charging or discharging, and the temperature of each secondary cell influences the charging or discharging performance. Accordingly, each secondary cell is required to operate under a condition in which the internal temperature of the battery pack is maintained within an appropriate temperature range, for example, 25 to 40° C.

The methods of controlling the internal temperature of a battery pack are categorized into an air cooling system using air as coolant and a water cooling system using water as coolant. The air cooling system has a disadvantage of low cooling efficiency and the water cooling system has a disadvantage of a complex structure. Regarding the water cooling system, a battery pack employing a conventional water cooling system includes a battery housing member having at least one recess, a periphery portion disposed near the recess, and a plurality of coolant channels extending from the periphery portion to at least one portion of the recess, and at least one battery cell received in the recess or the respective recesses.

In the case of a cooling technology using a water cooling system, a conventional battery module is cooled such that the surfaces of a battery module are cooled by a cooling device. Particularly, an indirect cooling system in which a liquid-based heat sink is attached to a battery module has been widely used. When performing indirect cooling on a per-battery pack basis, to guarantee the performance and lifespan of battery cells, a design that can suppress the temperature variation among battery modules in a battery pack is required. However, when a large number of battery modules are packed in a battery pack, it is difficult to minimize the temperature variation among the battery modules.

U.S. Pat. No. 9,312,580 (Apr. 12, 2016) discloses a system battery module including a battery module composed of a plurality of cell assemblies. The cell assembly includes a first flat plate that radiates heat during operation of battery cells, and a phase change material (PCM) layer provided on the first flat plate. The PCM layer is made of a phase change material that changes in phase when absorbing heat. The PCM material is disposed around a plurality of graphite layers and is formed to have a predetermined thickness. The system battery module includes the plurality of graphite layers to facilitate thermal conduction through the PCM layer. However, this literature does not disclose a CMP capsule for temperature control of a cooling fluid.

U.S. Pat. No. 8,109,324 (Feb. 7, 2012) discloses a microchannel heat exchanger including: a slurry containing liquid and/or solid microencapsulated particulate phase change material capable of melting in a heat range required for cooling a heat generating component; a heat exchanger including a plurality of microchannels which are non-linear passages for a liquid slurry, the microchannels having a height-to-width ratio of 5:1 and a width of 50 to 500 µm, the heat exchanger being disposed on or being able to be disposed on the heat generating component, the slurry being contained in the microchannels of the heat exchanger, and the microcapsulated particulate phase change material having a diameter that corresponds to 5% to 20% of the width of the microchannel; and a pump for pumping the liquid slurry so that the liquid slurry can be transported through the heat exchanger at a predetermined flow rate, wherein the microchannel heat exchanger is used for cooling a heat-generating component having a heat load of 100 W/cm$^2$. However, this literature does not disclose a configuration including a PCM capsule used for temperature control to maintain a uniform temperature of a cooling fluid over the entire area of a battery module.

Japanese Patent Application Publication No. 2011-527740 (Nov. 4, 2011) discloses a device including: (i) a capsule array provided in a housing, the capsule array including (a) at least one first array portion including at least two flies facing each other, being in contact with each other at least at a portion thereof, and defining a first capsule framework containing a plurality of capsules, each capsule containing a thermal energy storage material (TESM) and having a predetermined volume and (b) at least one second array portion including at least two flies facing each other, being in contact with each other at least at a portion thereof, and defining a second capsule framework containing a plurality of capsules, each capsule containing a thermal energy storage material (TESM) and having a predetermined volume; and (ii) a fluid channel defined by a volume between a first array component and a second array component, wherein the first array component and the second array component are separated from each other with a gap of 20 mm or less therebetween, and wherein each fluid channel of the device includes a plurality of non-planar passages. However, this patent literature does not disclose a configuration including a PCM capsule for temperature control for obtaining a uniform temperature of a cooling fluid for a battery module.

PHILLIPS LABORATORY, Space and Missiles Technology Directorate, Air Force Materiel Command Kirkland Air Force Base, NM 87117-5776 (Nov. 30, 1993) discloses a PCM application technology for temperature control of a nickel-hydrogen battery mounted in an electric vehicle. However, a PCM capsule configuration for controlling the temperature of a cooling fluid of a heat sink for a battery module is not disclosed.

Therefore, there has been no disclosure, so far, for a PCM capsule-applied battery-cooling heat sink which features controlling the temperature of a cooling liquid flowing through battery modules to be uniform by using a PCM, in order to solve a problem in that the temperature of a cooling liquid of a heat sink used for large-area battery modules constituting a high power and high capacity battery pack that is non-uniform. Further, there has been no disclosure for a battery module including such a heat sink.

DOCUMENTS OF RELATED ART (Patent Literature 0001) U.S. Pat. No. 9,312,580 (Apr. 12, 2016)
(Patent Literature 0002) U.S. Pat. No. 8,109,324 (Feb. 7, 2012)
(Patent Literature 0003) Japanese Patent Application Publication No. 2011-527740 (Nov. 4, 2011)
(Non-patent Literature 0001) PHILLIPS LABORATORY, Space and Missiles Technology Directorate, Air Force Materiel Command Kirkland Air Force Base, NM 87117-5776 (Nov. 30, 1993)

DISCLOSURE

Technical Problem

Accordingly, the present invention has been made keeping in mind the above problems occurring in the related art, and an objective of the present invention is to provide a battery-cooling heat sink provided with a PCM capsule, the heat sink being capable of maintaining a uniform temperature of a cooling fluid flowing through a battery module over the entire area of the battery module by using the PCM capsule, thereby solving a problem with a conventional battery module in which a temperature of a cooling fluid is not uniform over the entire area of the battery module, and is to provide a battery module including the same heat sink.

Another objective of the invention is to minimize a temperature gradient of a cooling fluid by simply mounting a PCM capsule without changing the internal structure of an existing heat sink provided in a battery module constituting a battery pack.

It is a further objective of the present invention to provide a method of improving a cooling performance without affecting the induction of a cooling fluid of an existing heat sink provided in a battery module constituting a battery pack and of securing the performance and lifespan of the battery pack in which the battery module is mounted.

Technical Solution

In order to achieve the above objectives, according to one aspect of the present invention, there is provided a battery module including: a battery cell stack including one or more cells; a module assembly in which the battery cell stack is installed, the module assembly including a heat sink configured to absorb and dissipate heat generated by the battery cell stack; and a phase change material (PCM) unit provided at a predetermined position on the heat sink and controlling a temperature of a cooling fluid flowing through the heat sink.

The heat sink may include a fluid channel and one or more openings for introduction and discharge of the cooling fluid.

The PCM unit may be installed at a position at which a temperature of the cooling fluid rises to be equal to or to exceed a predetermined temperature.

The PCM unit may be installed at a position $L_P$ calculated by the following equation in which $L_P$ is in a range of 0 to 0.5:

$$L_P = ((L_{out} - L_{PCM})/L_{out})$$

(wherein an inlet $L_{in}$ for a cooling fluid is a start point for measurement of a length of a fluid channel, an outlet $L_{out}$ for the cooling fluid is an end point for measurement of length of the fluid channel, and $L_{PCM}$ is a length of the PCM unit starting from the inlet)

A phase change material (PCM) included in the PCM unit may be composed of one type of PCM or two or more types of PCMs selected among an organic PCM, an inorganic PCM, and an eutectic PCM.

The PCMs included in the PCM unit may have an impregnated, encapsulated, or shape-stabilized form. Alternatively, two or more forms of PCMs are mixed in the PCM unit.

One or more PCM layers that can absorb heat generated by the cells may be disposed between the cells provided in the battery module.

In addition, one or more heat insulating layers may be disposed between the cells provided within the battery module to prevent the heat generated by at least one cell of the cells from being transferred to an adjacent cell of the cells.

A number of PCMs included in the PCM unit may be determined to satisfy a condition that a temperature of the cooling fluid flowing through the heat sink varies within a range of ±2° C. from a mean temperature of the cooling fluid.

There is provided an electronic device equipped with any battery module disclosed above.

There is provided an electric vehicle equipped with any battery module disclosed above.

There is provided a hybrid vehicle equipped with any battery module disclosed above.

There is provided an energy storage system equipped with any battery module disclosed above.

DESCRIPTION OF DRAWINGS

FIG. 1 is a schematic view illustrating analysis of heat conduction in a heat sink of a battery module according to a comparative example;

FIG. 2 is a view illustrating a temperature gradient of a cooling liquid in a battery module according to the comparative example;

FIG. 3 is a view illustrating a temperature gradient of a cooling fluid in each section of a cooling channel of a battery module according to another comparative example;

FIG. 4 is a schematic view illustrating a heat sink of a battery module to which a phase change material (PCM) capsule is applied, according to one embodiment of the present invention;

FIG. 5 is a view illustrating a temperature gradient of a battery module heat sink to which a PCM capsule is applied, according to one embodiment of the present invention; and FIG. 6 is a graph illustrating changes in temperature at an outlet of a battery module heat sink to which a PCM capsule is applied, according to one embodiment of the present invention.

MODE FOR INVENTION

Hereinafter, embodiments of the present invention will be described such that those skilled in the art can easily implement the invention, with reference to the accompanying drawings. In describing embodiments of the present invention, well-known functions or constructions will not be described in detail when it is determined that they may obscure the spirit of the present disclosure.

Further, throughout the drawings, members or elements having the same or substantially same function are denoted by the same reference signs. Throughout the description, when a component is described as being "connected", "combined", or "coupled" with another component, it should be understood that the component may be connected or coupled to another component directly or with another component interposing therebetween. It will be further understood that when a component "comprises" or "has" another component, it means that the component may further include another component, not excluding another component unless stated otherwise.

Hereinafter, embodiments of the present invention will be described below with reference to the accompanying drawings.

A battery cell stack is a structure in which a plurality of battery cells is stacked. Preferably, the battery cells are plate-shaped battery cells to provide a high integration rate for a predetermined space. In the battery cell stack, the battery cells are arranged in a face-to-face manner.

Although not illustrated in the drawings, the battery cell stack may further include a stack frame used for stacking of the battery cells. The stack frame is an element used for stacking of the battery cells. The stack frame holds the stacked battery cells not to collapse, has a structure enabling multiple battery cells to be stacked, and functions to guide stacking of battery cells. The stack frame also may be referred to as other terms, such as, a cartridge. It has an empty rectangle shape (frame shape) with a hollow interior. In this case, the outer peripheries of a battery cell are disposed on the four sides of the stack frame.

Each battery cell includes: an electrode assembly including an anode plate, a separator, and a cathode plate; a plurality of anode tabs protruding from the anode plate; a plurality of cathode tabs protruding from the cathode plate; and an anode lead and a cathode lead connected to the anode tabs and the cathode tabs. The battery cells used herein may be pouch battery cells. The pouch battery cell may be prepared by placing an electrode assembly inside an external casing that is a laminate composed of a resin layer and a metal layer and by performing heat plate bonding on the outer surface of the external casing for sealing.

A cooling system for a battery pack includes a plurality of battery modules, a cooling tube installed on the battery module and configured to absorb heat generated by the battery modules, a cooling fluid pump pumping a cooling fluid to be introduced into the cooling tube through an inlet, a cooling fluid tank connected to the cooling fluid pump and storing the cooling fluid, and a radiator for cooling the cooling fluid that is heated while passing through the cooling tube, and transferring the cooled cooling fluid to the cooling fluid tank.

In a battery module package constructed as described above, the temperature rises due to the heat generated by battery cells during charging or discharging operations of the cells, and the increased temperature deteriorates an overall operation performance of the battery. Accordingly, thermal management for maintaining an appropriate temperature of a battery is an important management factor for a battery.

For prevention of deterioration of the performance of a battery and improvement of the durability of a battery, a uniform temperature needs to be maintained for a plurality of battery cells. When there is a temperature variation among battery cells, the most deteriorated battery cell influences the overall performance of the whole battery. However, it was difficult to maintain a uniform temperature for a plurality of battery cells with a conventional battery cooling system. To solve this problem, the present invention provides a new battery module. The battery module includes a battery cell stack including one or more cells and a module assembly in which the battery cell stack is installed. The module assembly includes a heat sink for absorbing and dissipating heat radiated from the battery cell stack and a PCM unit installed at a predetermined position on the heat sink to control the temperature of a cooling fluid.

The heat sink may include one or more openings for introduction and discharge of the cooling fluid and a fluid channel for circulation of the cooling fluid.

The number of openings for introduction and discharge of the cooling fluid is not limited.

The openings for introduction and discharge of the cooling fluid may be composed of one inlet and one outlet.

The openings for introduction and discharge of the cooling fluid may be composed of one inlet with respect to two or more outlets. Alternatively, they are composed of two or more inlets with respect to one outlet.

The number of the inlets and the number of the outlets may not be specifically limited to certain numbers. The numbers of the inlets and outlets may be set so as to obtain uniformity in the temperature of the cooling fluid according to a heat absorption ratio of the module assembly with respect to a heat generation amount.

The PCM unit may be installed at a position at which the temperature of the cooling fluid rises to be equal to or to exceed a predetermined temperature.

The PCM unit may be installed at a position $L_P$ calculated by the following equation in which $L_P$ is within a range of 0 to 0.5:

$$L_P = ((L_{out} - L_{PCM})/L_{out})$$

(wherein an inlet $L_{in}$ of a cooling fluid is a start point for measurement of a length of a fluid channel, an outlet $L_{out}$ of the cooling fluid is an end point for measurement of the length of the fluid channel, and $L_{PCM}$ is a length of a PCM unit starting from the inlet).

The temperature of the cooling fluid in the heat sink equipped with the PCM unit may be within a range of 20 to 80° C. Preferably, it may be within a range of 40 to 60° C. More preferably, it may be within a range of 45 to 55° C.

When the temperature of the cooling fluid of the heat sink is out of the range, the battery cells in the battery module cannot normally operate due to overheating or non-uniform temperature distribution among the battery cells.

When the cooling fluid inlet L+ is set as the start point for measurement of the length of the fluid channel, the cooling fluid outlet $L_{out}$ is set as the end point for measurement of the length of the fluid channel, and $L_{PCM}$ is a length of the PCM unit starting from the inlet, the position $L_P$ of the PCM unit may be obtained by the equation "$L_P = ((L_{out} - L_{PCM})/L_{out})$" and it may be within a range of 0 to 0.5. Preferably, the $L_P$ may be within a range of 0 to 0.3. More preferably, the $L_P$ may be within a range of 0 to 0.1.

When the $L_P$ is outside the preferable range, it is difficult to obtain the effect of uniformizing the temperature of the cooling fluid in the heat sink.

The PCM unit may be located at a position near the outlet of the heat sink, and it may be disposed at a position at which a weld bead of the heat sink is formed.

It is apparent that the position of the PCM unit is not particularly limited and it may be set to any position at which it is possible to uniformize the temperature of the cooling fluid in the heat sink, thereby maximizing the cooling effect for the battery module.

A phase change material (PCM) included in the PCM unit may be composed of one type of PCM or two or more types of PCM selected from among an organic PCM, an inorganic PCM, and an eutectic PCM.

The organic PCM may include one or more types selected among paraffin $C_{16}$-$C_{18}$, polyglycol E600, paraffin wax, paraffin $C_{16}$-$C_{28}$, paraffin $C_{20}$-$C_{33}$, paraffin $C_{13}$-$C_{24}$, 1-dodecanol, 1-tetradecanol, paraffin $C_{19}$, and vinyl stearate.

The inorganic PCM may include one or more types selected among $CaCl_2.6H_2O$, $Zn(NO_3)_2.6H_2O$, $KF.4H_2O$, $Na_2S_2O_3.5H_2O$, $Na_2SO_4.10H_2O$, $Mn(NO_3)_2.6H_2O$, $LiNO_3.3H_2O$, and $Na(CH_3COO).3H_2O$.

The eutectic PCM may include one or more types selected among 47% $Ca(NO_3)_2.4H_2O$+33% $Mg(NO_3)_2.6H_2O$, 37.5% Urea+63.5% acetamide, 48% $CaCl_{2n}$+4.3% NaCl+0.4% KCl+47.3% $H_2O$, 66.6% $CaCl_2.6H_2O$+33.3% $MgCl_2.6H_2O$, 60% $Na(CH_3COO).3H_2O$+40% $CO(NH_2)$, 61.5% $Mg(NO_3)_2.6H_2O$+38.5% $NH_4NO_3$, 58.7% $Mg(NO_3).6H_2O$+41.3% $MgCl_2.6H_2O$, and 67.1% naphthalene+32.9% benzoic acid.

The PCMs in the PCM unit have an impregnated, encapsulated, or shape-stabilized form. Alternatively, two or more forms of PCMs may be mixed in the PCM unit.

The impregnated PCM provided in the PCM unit is obtained by injecting any PCM selected among the above examples into holes or pores of a material (support material) of the PCM unit.

The support material of the PCM unit is not particularly limited. Any material provided with holes or pores may be used as the support material of the PCM unit. Preferably, the material may be a metal or resin body having microholes or pores. More preferably, it may be a porous ceramic body.

The encapsulated PCM of the PCM unit may be formed through any one method selected among encapsulation using a coacervation reaction of gelatin and gum arabic, encapsulation using a coco fatty acid and a PCM, encapsulation using n-hexadecane and poly methyl meth acrylate (PMMA), encapsulation of poly ethylene glycol with acrylic polymer, and encapsulation using poly vinyl acetate and tetradecane.

The shape-stabilized PCM (SSPCM) may be formed by mixing a liquid PCM and a support material. The shape-stabilized PCM is also referred to as microencapsulation. The shape-stabilized PCM may be obtained through the process: 50 parts by weight of octadecane and 50 parts by weight of high density poly ethylene (HDPE) are mixed; the resulting mixture is treated with a chromic acid; an additive is added to the treated mixture; and the resultant mixture is thermally treated.

One or more PCM layers may be disposed between the battery cells provided in the battery module to absorb heat generated by one or more battery cells constituting the battery module.

In addition, one or more thermal insulating layers may be disposed between the battery cells provided within the battery module to prevent the heat generated by at least one battery cell from being transferred to the adjacent battery cells.

The PCM layer has a thickness of 2 mm or less or has the same thickness as the battery cells.

The material of the heat insulation layer may be an inorganic heat insulating material, such as glass, ores, or carbon. The material of the heat insulation layer may be an organic heat insulating material, such as foamed polystyrene, foamed polyurethane, or foamed vinyl chloride.

The content of the PCMs in the PCM unit may be determined to satisfy the condition in which the heat of the cooling fluid is absorbed to the extent that the temperature of the cooling fluid passing through the heat sink varies within a range of ±2° C. from a mean temperature of the cooling fluid flowing through the heat sink.

Embodiment Example

To evaluate the cooling effect of a PCM capsule-applied heat sink for a battery module according to an embodiment example, changes in temperature of heat sinks, one of which is equipped with a PCM unit and the other of which is equipped no PCM unit, were compared. In Embodiment Example and Comparative Example, battery modules having the same size and capacity were used. Only difference between Embodiment Example and Comparative example was absence and presence of a PCM unit applied to a heat sink for a battery module. The temperature of the cooling fluid introduced through the inlet of the heat sink was set to 20±5° C. The temperatures at the outlets of the heat sinks according to Embodiment Example and Comparative Example were compared, and the temperature gradients of the battery modules according to Embodiment Example and Comparative Example were compared.

Comparative Example 1

FIG. 1 is a schematic view illustrating analysis of heat conduction of a heat sink of a battery module according to Comparative Example 1.

A battery pack includes a plurality of battery modules 100 and a heat sink 200 provided with a fluid channel 230 along which a cooling fluid flows to perform heat exchange with a plurality of battery cells provided in each battery module, thereby cooling the battery modules.

FIG. 2 is a view illustrating a temperature gradient of a cooling liquid in a battery module according to Comparative Example 1.

Regarding the case where the heat sink is not provided with a PCM unit, the temperature gradient of the battery modules will be described below. As the cooling fluid becomes closer to the outlet of the heat sink, since the cooling fluid absorbs more heat from the battery modules, the temperature of the cooling fluid increases as the distance to the outlet of the heat sink decreases. For this reason, temperature variation occurs among the battery modules provided within a battery pack, which deteriorates the performance and reduces the lifespan of the battery cells constituting the battery modules.

Comparative Example 2

FIG. 3 is a view illustrating a temperature gradient of a cooling fluid in each section of a cooling channel of a battery module according to Comparative Example 2.

This comparative example was configured such that a PCM unit was not provided on a heat sink and a fluid channel was segmented into a plurality of sections. To reduce a temperature difference between an inlet 210 and an outlet 220 of a heat sink having a simple ordinary fluid channel, analysis is performed on a fluid channel that is segmented. Compared with Comparative Example 1, the temperature difference between the inlet and outlet of the heat sink is reduced. However, it is confirmed that the design of the segmented cooling channel creates a differential pressure of the cooling fluid in the heat sink. Therefore, in this case, a measure for overcoming the problems of the cooling water pressure difference and the battery temperature difference is required.

Embodiment

FIG. 4 is a schematic view illustrating a heat sink of a battery module to which a phase change material (PCM) capsule is applied, according to one embodiment of the present invention.

A PCM capsule having a property of changing in phase according to temperature is provided to a heat sink provided in a battery module, a thermal interface material (TIM) 300, and a heat sink. PCM capsules are applied to battery modules disposed near the outlet of the heat sink of the battery modules, to reduce an influence of a temperature variation among the battery modules. A PCM having a phage transition temperature within a range of 30 to 40° C. that is an appropriate temperature range for the battery modules is used.

FIG. 5 is a view illustrating a temperature gradient of a battery module provided with a PCM capsule, according to one embodiment of the present invention.

Comparing the temperature gradients of the battery modules between the case where the PCM capsule is provided and where the case where the PCM capsule is not provided, it is seen that the temperature difference between the inlet and the outlet of the heat sink is dramatically reduced when the PCM capsule is provided on the heat sink. The temperature of the cooling fluid and the PCM capsule disposed at the outlet of the heat sink become uniform. Therefore, by using this technology, it is possible to obtain the uniform temperature over the entire area of the battery pack composed of a plurality of battery modules.

FIG. 6 is a graph illustrating changes in temperature at outlets of heat sinks for a battery module, according to the presence and absence of the PCM capsule according to one embodiment of the present invention.

To confirm the effect of the embodiment, the temperature of the cooling fluid in the heat sink of each battery module constituting a battery pack is measured. The numbers on the X axis represent battery module numbers of respective battery modules arranged in order from the outlet of the heat sink. A blue line indicates temperature changes of battery modules each provided with a heat sink having no PCM unit, and a red line indicates temperature changes of battery modules each provided with a heat sink having a PCM unit. As the battery module number increases from 1 to 10, the temperature of the battery module increases. As for the battery modules numbered 1 to 5, there is no temperature difference between the inlet side and the outlet side of the heat sink. However, in the case of the battery modules numbered 5 to 10, a temperature deviation from an appropriate operation temperature of 37° C. occurs by 13° C. when the PCM unit is absent, but the temperature deviation is reduced to 4° C. when the PCM unit is provided.

Although the present invention has been described with reference to embodiments, those skilled in the art will appreciate that various substitutions, additions, and changes are possible, without departing from the technical spirit of the present invention described above. Therefore, it should be understood that such substitutions, additions, and changes also fall within the protection scope of the present invention defined by the accompanying claims.

INDUSTRIAL APPLICABILITY

According to the present invention, the battery-cooling heat sink provided with a PCM capsule, and the battery module including the heat sink, have an effect of minimizing a temperature difference of a cooling fluid in the heat sink.

In addition, the present invention has an effect of preventing a temperature of a cooling fluid at an outlet side from being increased.

In addition, the present invention has an effect of minimizing a temperature gradient of a cooling fluid without changing the internal structure of an existing heat sink provided in a battery module, thereby reducing a design cost and a manufacture cost for a battery module.

In addition, the present invention has an advantage of improving the performance and lifespan of battery cells by minimizing a temperature variation among battery modules during charging or discharging of battery modules.

The invention claimed is:
1. A battery module comprising:
a battery cell stack including one or more cells;
a module assembly in which the battery cell stack is installed, the module assembly including a heat sink configured to absorb and dissipate heat generated by the battery cell stack; and
a phase change material (PCM) unit provided at a predetermined position on the heat sink and controlling a temperature of a cooling fluid flowing through the heat sink, wherein a position $L_P$ of the PCM unit is determined such that $L_P$ in the following equation is within a range of 0 to 0.5:

$$L_P=((L_{out}-L_{PCM})/L_{out})$$

wherein an inlet $L_{in}$ for a cooling fluid is a start point for measurement of a length of a fluid channel, an outlet $L_{out}$ for the cooling fluid is an end point for measurement of the length of the fluid channel, and $L_{PCM}$ is a length of the PCM unit starting from the inlet.

2. The battery module according to claim 1, wherein the heat sink includes a fluid channel and one or more openings for introduction and discharge of the cooling fluid.

3. The battery module according to claim 1, wherein the PCM unit is disposed at a position at which the temperature of the cooling fluid flowing through the heat sink rises to be equal to or to exceed a predetermined temperature.

4. The battery module according to claim 1, wherein the PCM unit contains at least one type of PCM or two or more types of PCMs selected from an organic PCM, an inorganic PCM, and an eutectic PCM.

5. The battery module according to claim 4, wherein the PCM included in the PCM unit takes one or more forms selected from among an impregnated PCM, an encapsulated PCM, and a shape-stabilized PCM.

6. The battery module according to claim 1, wherein the PCM unit comprises one or more PCM layers configured to absorb heat generated by the one or more cells.

7. The battery module according to claim 1, wherein the one or more cells includes a plurality of cells, and
wherein the battery module further comprises one or more heat insulating layers configured to prevent heat generated by at least one cell of the plurality of cells from being transferred to an adjacent cell of the plurality of cells.

8. The battery module according to claim 4, wherein a number of PCMs included in the PCM unit is determined to satisfy a condition that the temperature of the cooling fluid flowing through the heat sink varies within a range of ±2° C. from a mean temperature of the cooling fluid.

9. An electronic device equipped with the battery module according to claim 1.

10. An electric vehicle equipped with the battery module according to claim 1.

11. A hybrid vehicle equipped with the battery module according to claim 1.

12. An energy storage device equipped with the battery module according to claim 1.

* * * * *